United States Patent [19]

Pomella et al.

[11] 4,237,602
[45] Dec. 9, 1980

[54] METHOD OF MANUFACTURE OF PRECISION TRANSDUCER FOR POSITION MEASUREMENTS

[75] Inventors: Piero Pomella; Nino Azzani, both of Ivrea, Italy

[73] Assignee: Ing. C. Olivetti & C., S.p.A., Ivrea, Italy

[21] Appl. No.: 956,240

[22] Filed: Oct. 31, 1978

Related U.S. Application Data

[62] Division of Ser. No. 787,536, Apr. 14, 1977, Pat. No. 4,150,532.

[30] Foreign Application Priority Data

May 18, 1976 [IT] Italy .............................. 68210 A/73

[51] Int. Cl.³ ............................................ H01F 41/06
[52] U.S. Cl. .................................. 29/602 R; 29/606; 29/846
[58] Field of Search ..................... 29/602 R, 606, 625, 29/829, 846; 336/129, 200, 122, 123, 115

[56] References Cited

U.S. PATENT DOCUMENTS

| | | | |
|---|---|---|---|
| 3,522,568 | 8/1970 | Hasbrouck | 336/200 X |
| 3,673,584 | 6/1972 | Farrand | 336/129 X |

*Primary Examiner*—Carl E. Hall
*Attorney, Agent, or Firm*—Schuyler, Banner, Birch, McKie & Beckett

[57] ABSTRACT

A precision transducer for position measurements comprises a pair of supports, one of which is movable with respect to the other. Each support is provided with an electric winding constituted by equidistant serially connected printed circuit conductors extending transverse to the direction of movement. The winding of one of the supports comprises a plurality of groups of conductors connected in series and intercalated with the conductors of the other group(s). Each group of conductors is printed on one face of a substrate, the other face of which bears auxiliary conductors connecting the conductors of the groups in series, through metallized holes formed through the substrate. The substrate is bonded to the said one support after the printing of the auxiliary conductors on the said other face, the groups of conductors being printed on the said one face after the substrate has been bonded to the support.

3 Claims, 5 Drawing Figures

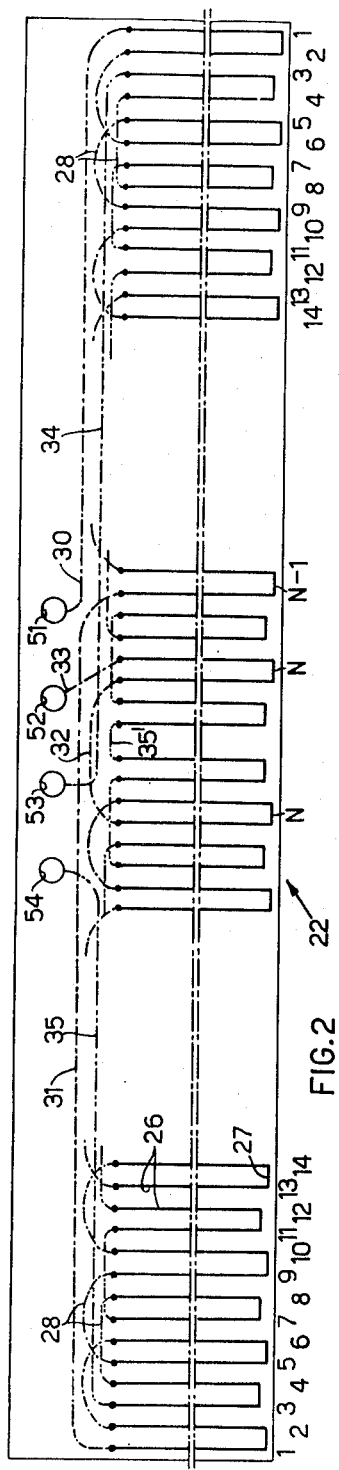
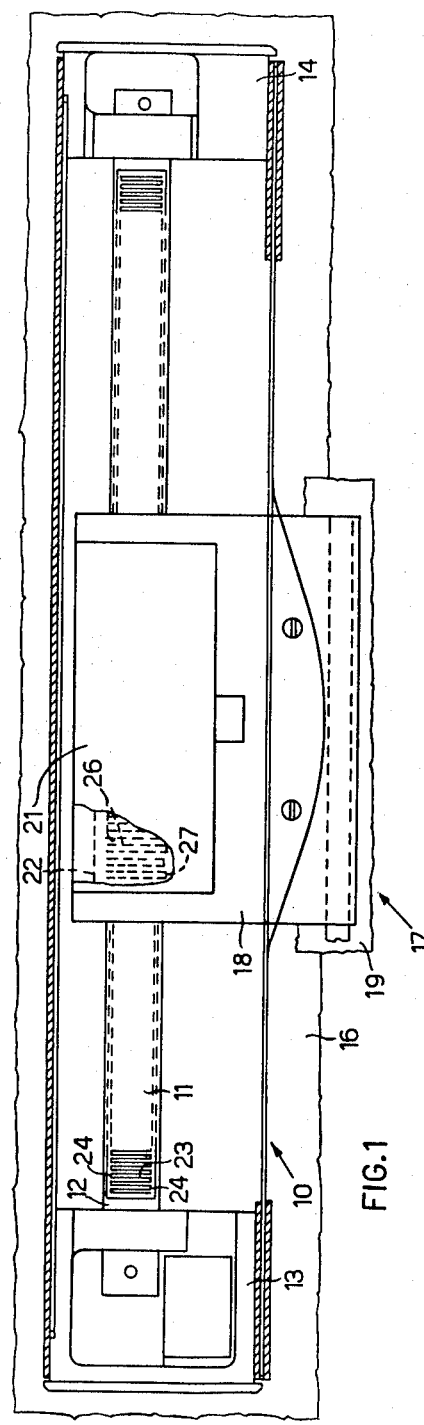
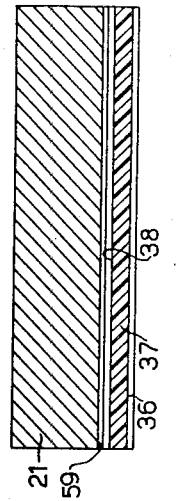

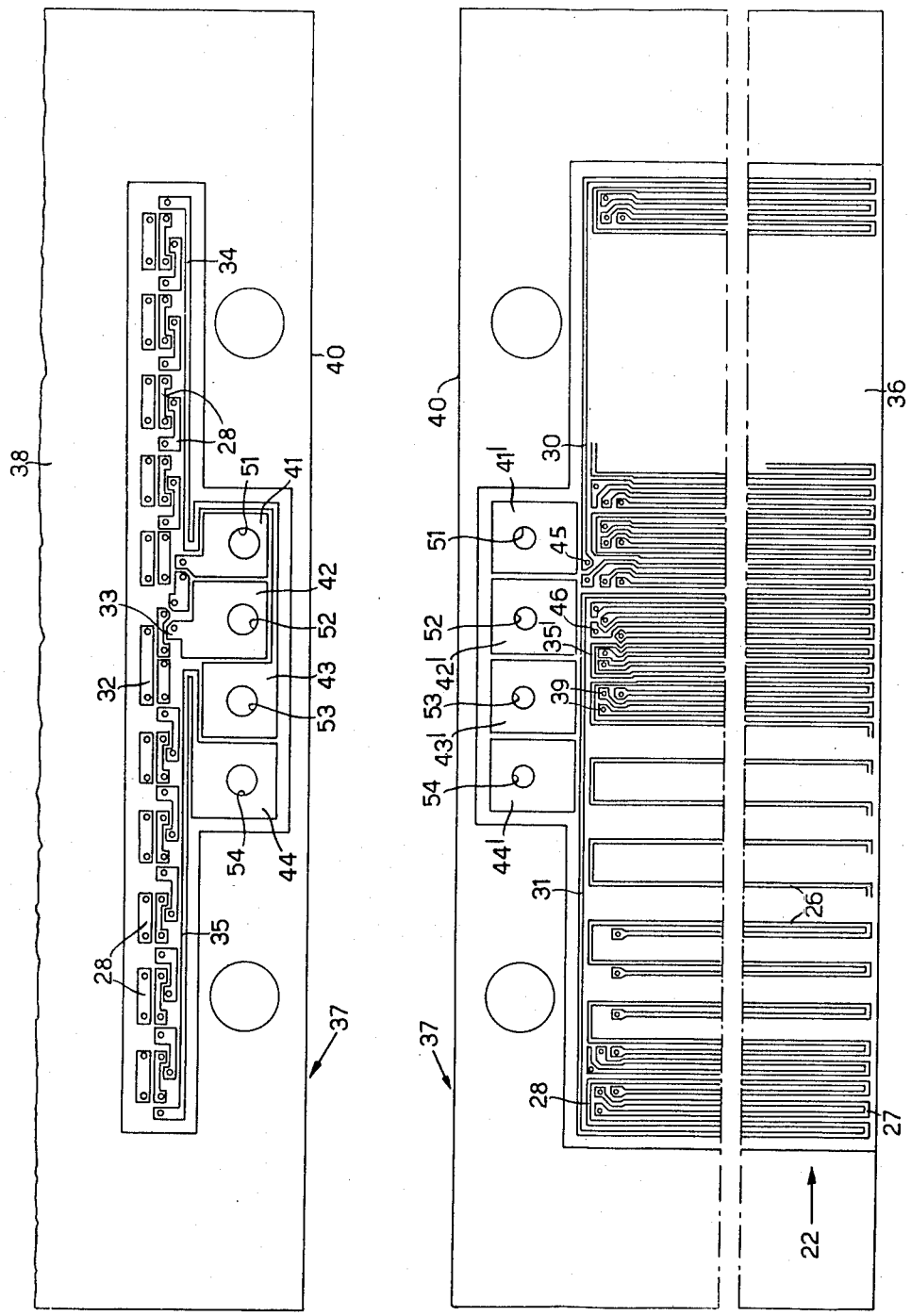

METHOD OF MANUFACTURE OF PRECISION TRANSDUCER FOR POSITION MEASUREMENTS

This is a division of application Ser. No. 787,536 filed Apr. 14, 1977, now U.S. Pat. No. 4,150,532.

BACKGROUND OF THE INVENTION

The present invention relates to precision transducers for position measurements and to a method of manufacture thereof. Such position transducers are used in numerically controlled machine tools and in dimension detectors for high-precision machining operations.

In these types of transducers, which generally comprise a pair of supports movable one with respect to the other and each provided with an electric winding constituted by a printed circuit, high precision of the printed circuits and of the supports is necessary. The latter must not deform in the course of time and the short term deformations arising from changes of external variables, such as temperature, humidity, etc., must be known.

Since the parts of the machine to which such transducers are fitted are generally made of cast iron, in order to make the deformations of the supports comparable with those of the parts of the machine, these supports generally consist of steel, aluminum or glass and are separated from the conductor by means of insulation. On a substrate constituted by the support and the insulation, there is disposed a sheet of copper from which the conductors of the winding are formed by photogravure, the conductors thus being extremely precise and perfectly located on the support.

As is known, the winding on one of the two supports of the transducer may be constituted by two groups of conductors, for the sine function and the cosine function respectively, which are intercalated in such manner that intersections of conductors are inevitable, so that it is impossible to produce the winding on a single face, by means of a printed circuit, without other connections. In known circuits, these connections are generally created by soldering auxiliary conductors covered with an insulation to particular platforms or islands and housing these conductors in suitable grooves in the support. The number of these soldered joints is generally high and they make the transducers relatively costly.

Transducers for position measurements have already been proposed in which the winding appertaining to one of the two members is obtained by means of a multi-layer structure. In these transducers, the active conductors of the winding, for example of the slider, are printed partly on one face and partly on the other face of an insulating board. These transducers, however, have the disadvantage that the two parts of the winding are at different distances from the winding of the scale, whereby signals of different intensities are induced, producing errors in the measurements. Moreover, that part of the circuit which is on the face of the board to be bonded to the support undergoes deformation during the bonding operation, which is generally performed after heating under pressure. Finally, it is extremely difficult to obtain acceptable location of the printed circuit when the multi-layer structure is cemented to the support.

SUMMARY OF THE INVENTION

The object of the invention is to provide a precision transducer in which the soldered joints of the individual conductors are eliminated and in which the conductors are located exactly with respect to the support.

According to the present invention, there is provided a precision transducer for position measurements, comprising a pair of supports movable relative to each other and each provided with an electric winding constituted by equidistant serially connected printed circuit conductors extending transverse to the direction of relative movement, the winding of one of the supports comprising a plurality of groups of conductors, the conductors of each group being connected in series with each other and intercalated with the conductors of the other group(s), each group of conductors being printed on one face of a substrate, the other face of which bears auxiliary conductors connecting the conductors of the groups in series.

There is further provided a method of making the transducer, wherein the substrate is bonded to the said one support after the printing of the auxiliary conductors on the said other face, the groups of conductors being printed on the said one face after the substrate has been bonded to the support.

It is, therefore, clear that the active conductors of the winding are not deformed during the bonding operation and can be located perfectly with respect to the support.

BRIEF DESCRIPTION OF THE DRAWINGS

The invention will be described in more detail, by way of example, with reference to the accompanying drawings, in which:

FIG. 1 is a plan view, partly in section, of a precision transducer embodying the invention for linear position measurements;

FIG. 2 is a diagram of a winding of the transducer of FIG. 1;

FIG. 3 is a diagrammatic view of one face of a board supporting the winding of FIG. 2;

FIG. 4 is a diagrammatic view of the other face of the board for the auxiliary conductors of the winding of FIG. 2; and FIG. 5 is a cross-section of the board of FIGS. 3 and 4.

The invention is described here by way of example in its application to a linear transducer. It may, however, be applied equally to a rotary transducer.

DESCRIPTION OF THE PREFERRED EMBODIMENT

Referring to FIG. 1, the scale 10 of a precision transducer comprises an electric winding 11 which is printed by the photogravure technique from a conductive band or strip on an insulating layer on a support constituted by a flexible spring-steel band 12 which is tensioned between two end blocks 13 and 14. These are fixed to the machine part of which it is desired to measure the positions, for example a table 16 of a machine tool or of a dimension detector.

The transducer, moreover, comprises a slider 17, which comprises a structure 18 fixed by means of screws to a part 19 of the machine adapted to be shifted with respect to the table 16, for example, the spindle head of the machine tool or the feeler of the dimension detector. Fixed to the structure 18 is a rectangular steel plate 21, to the bottom surface of which there is fixed a second electric winding 22.

As is known, the winding 11 of the scale is constituted by a series of transverse conductors 23 equidistant from one another and connected alternately at their two ends by longitudinal conductors 24 so as to form a series of turns in the form of a fret. Since such a winding 11 does not create any intersection of conductors, it can be printed by photogravure in a single layer on the band 12.

The electric winding 22 of the slider 17 is also constituted by a series of generally equidistant transverse conductors 26 (FIG. 2) which are interconnected in pairs by longitudinal conductors 27 so as to form U-shaped turns which are connected in series. The turns of the winding 22 are divided into two groups representing two complementary functions, which depend on the electric phase difference with which they are supplied. Normally, since this phase difference is 90°, the two functions are the sine and cosine functions of the phase angle between the turns of the winding 11 and the turns of the winding 22.

The transverse conductors 23 of the scale 10 and the transverse conductors of the slider 17 (FIGS. 1 and 3), which determine the mutual induction as a function of the position of the slider 17 on scale 10, can be called active conductors. The connecting conductors 24 and 27 do not generate any induction, so that they can be regarded as passive.

The winding 22 (FIG. 2) is divided into two parts (right-hand and left-hand parts which are symmetrical with one another). The transverse conductors 26 of the two symmetrical parts of the winding 22 are numbered from the ends towards the centre. In each part, moreover, the turns of the winding portion for the sine function alternate with those of the winding portion for the cosine function. For clarity, the two portions are indicated with the bottoms of the U's staggered in FIG. 2, whereas in reality they are aligned, (as in FIG. 3).

The turns of each of the two functions must be connected in series by means of auxiliary conductors 28, in accordance with the diagram of FIG. 2. More particularly, the sine function requires connection of the conductors 2–6, 5–9, 10–14, etc., by means of the auxiliary conductors 28, while the cosine function requires connection of the conductors 4–8, 7–11, 12–16, etc.

The right-hand end conductors 1 of the sine function is connected by means of a conductor 30 to a terminal 51. The left-hand end conductor 1 of the same function, on the other hand, is connected by means of a connection 31 to the penultimate turn N-1 of the right-hand part of the same function. The last turn N of the right-hand part is connected on the one hand by means of a conductor 32 to the last turn N of the left-hand part and, on the other hand, by means of a conductor 33, to a terminal 52. In this way, the two parts of the sine function are connected in series.

The end conductors 3 of the cosine function are connected by means of two terminal conductors 34 and 35 to two terminals 53 and 54, while a conductor 35' connects the left-hand part of the cosine function in series to the right-hand part of this function. The four terminals 51 to 54 are then connected to the supply of the transducer.

It is clearly evident from the diagram of FIG. 2 that, both within the limits of a function and between the two functions, it is impossible to eliminate the intersections between the conductors 28 and 30 to 35 with a printed circuit on one face only. It is possible, however, to obtain the winding 22 on different surfaces by printed circuit techniques.

The active conductors 26 and the passive conductors 27, both of the sine function and of the cosine function, are all printed on one face 36 (FIG. 3) of an insulating board 37 constituted by a rectangular layer of heat-inducing insulating material containing glass fibres. The auxiliary conductors 28 (FIG. 4) are printed partly on the face 36 and partly on the other, upper, face 38 of the board 37. The conductors 35', 30 and 31 (FIG. 3) are printed on the face 36 of the board 37, while the terminal conductors 33, 34 and 35 and the conductor 32 are printed on the face 38 of the board 37.

The conductors 26 and 27 on the face 36 are connected to the conductors 28, 34 and 35 on the face 38 by means of a series of metallised holes 39 (FIGS. 3 and 4) formed in the board 37 in the vicinity of one edge only 40 of the board 37. The terminal conductors 34 and 35 are, moreover, connected to two conductive islands 43 and 44 printed on the face 38, while the conductors 30 and 33 are connected by means of two metallised holes 45 and 46 to another two islands 41 and 42 printed on the same face 38 of the layer 37. Each of the islands 41, 42, 43 and 44 is connected to a similar island 41', 42', 43' and 44' printed on the face 36 by means of a corresponding metallised hole which constitutes the corresponding terminal and is, therefore, indicated by the corresponding reference number 51 to 54 of FIG. 2. More particularly, each terminal is produced by fitting in each hole a gold-plated pin for soldering on the corresponding conductor of the supply circuit of the slider 17.

The board 37 is cemented to the plate 21 (FIG. 5) at the face 38 bearing the auxiliary conductors 28, so that the active conductors 26 are all facing the winding 11 of the scale 10 and equidistant from the latter. Since the board 37 is liable to be deformed by the effect of the temperature and the pressure necessary for cementing the layer 37 to the plate 21, the board 37 is cemented after the printing of the auxiliary conductors 28, 32, 34 and 35 and of the islands 41 to 44 on the face 38 and before the printing of the conductors 26, 27, 28, 30 and 31 and of the islands 41' to 44' on the face 36.

More particularly, the manufacture of the slider 17 takes place as follows. Firstly, the board 37 clad on both sides with copper foil is machined to form all the holes 39, 44, 46 and 51 to 54, together with possible holes useful as references or for fixing or other purposes. Chemical copper plating is then carried out on the two faces of the board 37. In this way, the walls of the holes are also coated with copper, so that electrical plated through connections are made between the two faces of the board. The thickness of the copper on the faces 36 and 38 is increased in this way until sufficient thickness is obtained for the copper coating, generally between 0.035 and 0.07 mm.

By means of the photogravure process for printed circuits, only the auxiliary conductors on the face 38 which will be turned towards the plate 21 are etched. This process, known per se, includes pickling the copper film, spreading a photographic resist, contact photography, developing, retouching and etching. During this process, the other face 36 of the board 37 and also the holes must be protected so as to keep the film on this face and the plated-through connections intact.

The surface of the copper on the face 38 is then treated with an oxidizing substance so as to make this surface rough. Complete degreasing of the face 38 and of the surface of the plate 21 to which it is to be cemented is carried out. Then, between the plate 21 and the face 38 of the board 37, there is interposed a dry cement or bonding agent film 59, for example a film of thermosetting acrylic resin with a thickness between 0.05 and 0.1 mm, of the type sold by the Minnesota Mining and Manufacturing Company under the trade name Scotch-Weld Brand Bonding Film AF-13. The sandwich is shut up in a suitable tool provided with locating pins for the plate 21 and the board 37, for the purpose of ensuring proper location of the latter on the slider 17. The sandwich is now subjected to a predetermined pressure by means of a suitable press and is heated to a predetermined temperature. More particularly, according to the cement or bonding agent used, this treatment requires a pressure of 20 to 30 kg/cm$^2$, a temperature of 120° to 170° C. and a duration of 0.5 to 3 hours, excluding the times necessary for reaching the desired temperature and for the subsequent cooling to room temperature.

The board 37 having been cemented in this way to the plate 21, the sandwich is subjected to a relaxing treatment by means of a series of heating and cooling cycles between room temperature and about 75° C., without pressure.

The free face 36 of the board 37 coated with copper is now subjected to the photogravure process, taking the precautions required for high-precision circuit printing. The conductors on the face 36 are located in this way with the maximum precision with respect to the plate 21 and are not affected by the cementing process.

Various modifications may be made in the transducer which has been described. For example, the terminals for connection to the supply may be distributed partly close to one edge and partly close to the opposite edge of the board 37.

What we claim is:

1. A method of making a precision transducer for position measurements, comprising a pair of supports movable relative to each other and each provided with an electric winding constituted by equidistant serially connected printed circuit conductors extending transverse to the direction of relative movement, the winding of one of the supports comprising a plurality of groups of conductors, the condutors of each group being connected in series with each other by auxiliary conductors and intercalated with the conductors of the other group(s), said method comprising the steps of printing the auxiliary conductors on one face of a substrate, bonding the substrate to said support and printing the groups of conductors on the other face after the substrate has been bonded to the support.

2. A method according to claim 1, wherein the bonding is effected by interposing a dry cement film between the said one face of the substrate and the said one support and subjecting the resulting sandwich to a given pressure and temperature for a predetermined time.

3. A method according to claim 2, wherein the dry cement film is constituted by a thermosetting acrylic resin having a thickness between 0.05 and 0.1 mm, the sandwich being subjected to a pressure between 20 and 30 kg/cm$^2$ and a temperature between 120° and 170° C. for a time of between 0.5 and 3 hours.

* * * * *

UNITED STATES PATENT AND TRADEMARK OFFICE
CERTIFICATE OF CORRECTION

PATENT NO. : 4,237,602
DATED : December 9, 1980
INVENTOR(S) : Piero Pomella et al.

It is certified that error appears in the above-identified patent and that said Letters Patent are hereby corrected as shown below:

On the front page of the patent, change Assignee "Ing. C. Olivetti & C., S.p.A." to -- Olivetti Controllo Numerica S.p.A. --

Signed and Sealed this

Tenth Day of March 1981

[SEAL]

*Attest:*

RENE D. TEGTMEYER

*Attesting Officer*  *Acting Commissioner of Patents and Trademarks*